Patented Apr. 3, 1928.

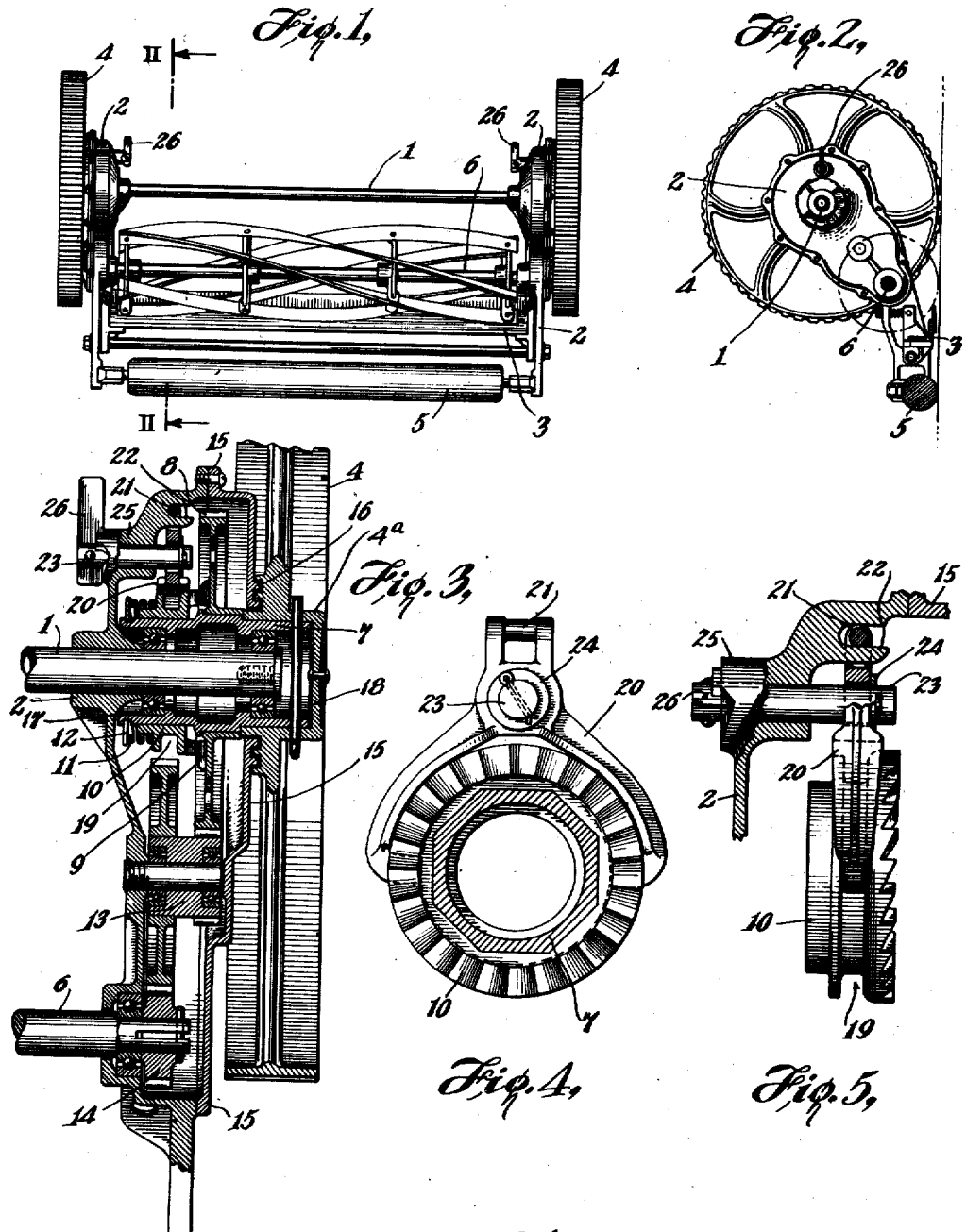

1,664,721

UNITED STATES PATENT OFFICE.

CHARLES C. WORTHINGTON, OF DUNFIELD, NEW JERSEY.

LAWN MOWER.

Application filed April 8, 1921. Serial No. 459,726.

The invention comprehends an improved ratchet clutch drive and cutter-releasing mechanism for lawn mowers and more particularly for mower units having rotary cutters as used in gang lawn mower machines. Its object is to produce a mechanism jointly serving the function of a ratchet drive for the cutter or fly knife of such machines and a cutter-releasing means therefor which interrupts the cutter drive when the machine is to be moved about without cutting the grass, and to produce such mechanism in compact form and rugged design, which will be the least subject to deterioration from wear and most easily operated to release the fly knife when desired and which also possesses various other practical advantages hereinafter made apparent to those skilled in this art. The invention also comprehends the general organization of the principal parts of the mower irrespective of the cutter releasing function, though particularly suited for use therewith.

In the accompanying drawings, Fig. 1 represents a top plan view of a lawn mower with the invention applied; Fig. 2, a vertical section thereof; Fig. 3 an enlarged section of the cutter driving gear train; and Figs. 4 and 5 are details of the movable clutch member and its shipper, etc.

The lawn mower shown comprises a frame consisting of a cross member or axle rod 1 rigidly uniting the two side members or gear cases 2 and a bed knife structure 3 which joins the rear ends of said gear case members. This frame is carried on a rolling support at each end represented in the present case by the ground or driving wheels 4 at the front and a roller 5 at the rear. Its rotary cutter or fly knife 6 is appropriately journalled in the gear cases to cooperate with the bed knife 3 in the usual way and is driven by the driving wheels. For this purpose a motion-multiplying, cutter-driving gear-train is housed in one or both of the side cases 2, according to customary design in this type of lawn mower, it being immaterial to this invention whether the fly knife is driven by one or both of the ground wheels. The axle rod 1 is secured to the casing 2 which contains such gear train by a pressed fit in the bored boss thereof as indicated in Fig. 3 and its end within said casing carries two ball bearings for supporting the main wheel hub 7. The hub ring 4ª of the ground wheel 4 is removably pinned or otherwise secured to the outer end of this main hub and the main gear 8 of the driving train is mounted on said hub to rotate thereon in a position or plane closely adjacent to the ground wheel. The inner face of the gear 8 is provided with a ring of ratchet teeth 9 adapted to be engaged by a corresponding ring of ratchet teeth on a clutch collar 10, which latter is mounted on the hub so that it is movable axially but not rotatably thereupon. In preference to the use of an ordinary spline for this purpose, the hub is made polygonal or octagonal in section as shown in Fig. 4, and the clutch collar slidingly fits such section, which mounting is found to possess special advantages. The collar is urged in the direction to clutch with the main gear by the spring 11 which is confined between the collar and a split ring 12 snapped into an annular groove in the end of the hub, so that the spring is thus concentric to and carried by and also rotated with the hub and collar. When the clutch is closed the main gear 8 is driven by the driving wheel 4 through the engaged ratchet teeth, and drives the compound gear 13 which is journalled on a stud in the gear-case and drives the pinion 14 fast on the fly knife shaft 6.

The side face ratchet teeth on the main gear 8 and the clutch collar 10 together constitute an over-running ratchet clutch couple through which the drive wheel may drive the cutter, as just stated, when rotating in a forward direction, but by means of which the fly knife may spin or rotate forwardly independently when necessary, as when the ground wheel stops or slows down, or when there are two gear-trains and one of the drive wheels rotates faster than the other. On such occasions the ratchet teeth ride over each other, slightly displacing the clutch collar against the clutch spring as will be understood. It may be noted in passing that by mounting the clutch members on a main hub of relatively large diameter as indicated, they are adapted to carry a considerable number of ratchet teeth of adequate size to enable the driving wheel to pick up its drive of the fly knife with the least shock and to impart its driving force thereto through many distributed points of contact instead of through one or a few driving pawls as in the case of the commonlawn mower ratchet arrangement, so that the construction described will be recognized as having advantages irrespective of the other features of this invention. It is preferred though not essential that the clutch collar 10 be the only axially movable member of the couple and that it shall be located on the opposite side of the main gear from the drive wheel 4 and shall be entirely enclosed within the gear-case against all access of dirt.

The gear-case is closed by a cover 15 applied on the outer side of the mower frame, i. e. adjacent the ground wheel, and is thereby adapted to contain a body of lubricant so that the gear train may run in oil. Escape of such oil is prevented by the labyrinthic packing 16 between the cover and the driving wheel. The inner end of the main hub 7 is open at 17 to receive lubricant for the ball bearings and the outer end of the hub is closed by the wall 18 of the hub ring. On the removal of the drive wheel, the cover may be taken off and the several interior parts are then exposed and may be removed without disassembling the parts constituting the frame of the mower.

When it is desired to release the fly knife so that it will not be driven by the drive wheel, the overrunning clutch members are opened and held opened by the operation of an exterior handle member which is mounted in the body part of the gear-case, forward of the cross rod 1 and on the inside of the frame of the mower. For this purpose, the clutch collar 10 is provided with an annular groove 19 engaged by a forked shipper lever 20, the general shape of which is shown in Figures 4 and 5. This lever is provided with a fulcrum journal 21 adapted to seat in an open hook bearing 22 secured to or cast on the interior of the gear-case and is adapted to be operated by a short pull rod 23, to which it is connected by a pin and washer 24. The pull rod extends through a long boss 25 in the casing wall and carries a cross pin handle 26 at its end. The snug fit of the rod in the boss 25 and the length of the latter prevents leakage of lubricant at this point. The end of the boss is formed with a cam face to engage the handle 26 and with an abutment lug so that rotation of the handle, a quarter turn, withdraws the rod longitudinally and thereby shifts the clutch collar against pressure of the clutch spring, so as to interrupt the drive to the fly knife. The reverse rotation restores the normal overrunning ratchet action of the couple. In the cutter-releasing position indicated in Figure 3, it will be noted that the handle 26 occupies a horizontal position and that the pressure exerted by the clutch spring maintains sufficient friction between the engaging parts of the handle and boss to insure its remaining in this position against accidental reverse rotation. The shipper itself fits the clutch groove 19 freely; its connection to the pull rod 23 is also loose fitting, and its fulcrum journal is loosely fitted to the seat 22 so that it constitutes a fulcrum only in one direction of the shipper's movement. By this relationship of the shipper parts, it will be observed that by turning the handle downwards, as in Fig. 5, the shipper becomes relieved of the clutch-spring pressure and disengaged from, or at least relieved of any appreciable pressure upon, any of its associated parts and thus becomes substantially a floating member whenever the clutch members are serving their normal ratchet-drive function. It is thus entirely independent of the normal drive connections, and if it should become inoperative or impaired for any reason, no effect will be transmitted to the cutter driving train. These characteristics of the shipper are obviously not dependent upon its form or shape, or the mode of its operation, and consequently it will be apparent that the advantages thereof may be obtained by widely different designs of shipper or releasing mechanism. It is preferred however to constitute the shipper as a lever and to fulcrum it loosely upon a hook bearing such as above referred to, inasmuch as this provides for easy assemblage and is particularly suited for location at the forward end of the mower frame where the operating handle 26 will be in front of the axle member 1, and therefore not only convenient of access but also sufficiently conspicuous, at all times, to enable its position of adjustment to be seen at a distance.

I claim—

1. In a lawn mower, a frame supporting a rotary cutter, a main hub journalled in said frame, a ground wheel having a hub ring removably secured to said main hub and a gear train connecting said main hub to the cutter, including an overrunning ratchet clutch couple comprising two clutch members and a clutch spring all mounted on said main hub.

2. In a lawn mower a frame having a rotary cutter and a main hub, a cutter-driving gear idly journalled on said hub, and provided with ratchet teeth constituting one of the members of an overrunning clutch couple, an associated clutch member therefor slidingly fitted to a polygonal portion of said hub and a clutch-closing spring therefor.

3. In a lawn mower, a cutter-driving train enclosed in a gear-case and including a ratchet clutch member and a closing spring therefor, in combination with a floating shipper lever loosely engaged with said member and with its fulcrum when the clutch functions as a ratchet but closely engaging its fulcrum at other times and means accessible outside of the gear-case for positively engaging the lever with said member and fulcrum to move the former to open position.

4. In a lawn mower, a closed, side gear-case adapted to confine lubricant, a cutter-driving gear train therein including an over-running ratchet clutch couple and means for interrupting the cutter drive comprising a manually shiftable operating member having connection with one of the clutch members and mounted within and occupying with a snug fit a long boss forming a part of the casing wall adapted to prevent escape of the lubricant.

5. In a lawn mower, a side gear-case, a cutter-driving gear train therein including an overrunning ratchet clutch couple, means for opening the clutch comprising a shipper lever and a hook-type fulcrum seat for said lever on the gear casing.

6. In a lawn mower a revolving cutter, two co-axial ground wheels one of which drives said cutter, a gear case adjacent to and inward of said driving wheel, a cutter-driving train in the case including a clutch device adapted for releasing the cutter and a manual member for operating said device mounted in advance of the axis of said ground wheels on the cutter side of said gear case and out of range of the cutter being further away from the axis of the cutter than the cutter blade edges.

7. In a lawn mower two co-axial independently rotatable ground wheels, a revolving cutter between the same, a side gear case, a cutter-driving train in said case including an over-running ratchet device and a manual releasing means for said ratchet mounted in advance of the axis of said ground wheels on the cutter side of said gear case.

8. In a lawn mower having two ground wheels and an intermediate rotary cutter, a side gear case between one of said wheels and the cutter, containing a cutter-driving gear train including a co-axial and axially movable clutch couple and formed to contain a lubricant, and manual clutch-opening means for axially shifting said couple comprising a rod having a bearing in and extending through the wall of said gear case.

9. In a lawn mower having two independently rotatable ground wheels and an intermediate rotary cutter, a side gear case containing a cutter-driving gear train including an over-running ratchet clutch couple located in a position co-axial with said ground wheels and means mounted on said gear case and extending into the interior and accessible on the exterior thereof for opening said clutch couple.

10. In a mower unit, a casing containing a train of gears, a ground wheel, a hub journaled upon the axis of the said ground wheel and driven by said ground wheel, a spring mounted circumferentially upon said hub and rotating therewith, a clutch member forming an abutment for such spring normally held in operative position thereby and slidingly mounted upon said hub, a main gear wheel journaled upon said hub and carrying teeth for engagement with said clutch member, means permitting said main gear wheel to rotate at a faster rate of speed than the clutch member when the said clutch is operating, while preventing said gear wheel from rotating at a slower speed, and means extending outside of said casing for sliding and holding said clutch out of engagement, and against the pressure of said spring.

11. In a mower unit, a ground wheel, a train of gears operated thereby, a rotary cutter in mesh with said train, a casing containing said gears, a main gear wheel forming part of said train, a hub axially supported to rotate on the center axis of said ground wheel and driven by said hub, said main gear wheel being journaled on said hub, a clutch member in sliding contact with said hub driven thereby and rotating therewith, teeth located upon said main gear wheel, means extending from said clutch member for engaging said teeth, and operating connection from outside of said casing for sliding said clutch member out of engagement with said teeth, said clutch member permitting said main gear wheel at any time to rotate at a speed faster than the said cylinder when driven through the said train of gears by the momentum of the said rotary cutter.

12. In a lawn mower, an oil-tight gear case, a fly-knife driving gear train located therein and including the ground wheel hub, the main gear located on said hub, a gear on the fly-knife shaft and an intermediate gear having toothed portions in mesh respectively with said main gear and said fly-knife shaft gear, and over-running clutch elements mounted one on the main gear and the other on the ground wheel hub and adapted to be engaged and disengaged by relative axial movement.

13. In a lawn mower, a fly-knife driving gear including the ground wheel hub, the main gear thereon and over-running ratchet clutch members, one of said members being fast to the hub and the other loose thereon and adapted to be engaged and disengaged by a relative axial movement.

14. In a lawn mower, a casing containing a fly-knife driving gear train, a ground wheel, a hub journalled upon the axis of the ground wheel and rotatable as a unit with the ground wheel, a large main gear constituting the first member of said gear train mounted on the hub and extending to the confines of the casing, a gear on the fly-knife shaft and an intermediate gear having toothed portions in parallel planes in mesh respectively with said main gear and said fly-knife shaft gear, a clutch couple, one member of which is on the main gear well out from its axis and the other of which is axially movable in a path between the part of the intermediate gear which meshes with the fly-knife shaft gear and said hub, and manual operating means for said clutch couple.

15. In a lawn mower, a ground wheel drive for a fly knife shaft including a gear train and an overrunning clutch associated therewith, said gear train having a main drive gear movably mounted on the hub of the ground wheel, and means for interrupting or completing said drive by relative axial shift of cooperating members of one of said two agencies first above named out of or into co-operative relation, one of said members being said main drive gear.

16. In a lawn mower, a ground wheel drive for a fly knife shaft including a gear train and an overrunning clutch associated therewith, said gear train having a main drive gear movably mounted on the hub of the ground wheel, and a spring normally completing said drive by holding said main drive gear and another cooperating member of one of said two agencies, first above named, in cooperative relation subject to interruption of the drive by their relative axial separation.

17. In a lawn mower, a cutter drive comprising a ground wheel, a fly-knife driving gear train including a main gear co-axial with the ground wheel, movable with respect thereto and driven thereby, and overrunning clutch elements, and a casing housing said gear train and clutch elements, said drive being adapted to be completed or interrupted by relative axial shift of said main gear and another member of the driving connections, one of which elements is loose and the other fast with respect to the ground wheel.

18. In a lawn mower, a gear case, a ground wheel having a hub extending into the gear case, and a cutter driving gear train in said case including a main drive gear movably mounted on the hub of the ground wheel and driven by the ground wheel, said gear train including operative connections adapted to be made or broken by a relative axial shift of said main gear and another member into or out of cooperative relation.

In testimony whereof, I have signed this specification.

CHARLES C. WORTHINGTON.

CERTIFICATE OF CORRECTION.

Patent No. 1,664,721.  Granted April 3, 1928, to

CHARLES C. WORTHINGTON.

It is hereby certified that error appears in the printed specification of the above numbered patent requiring correction as follows: Page 3, line 85, claim 11, strike out the word "hub" and insert the words "ground wheel", and line 88, strike out the word "thereby" and insert "by said hub"; and that the said Letters Patent should be read with these corrections therein that the same may conform to the record of the case in the Patent Office.

Signed and sealed this 1st day of May, A. D. 1928.

(Seal)

M. J. Moore,
Acting Commissioner of Patents.

member of which is on the main gear well out from its axis and the other of which is axially movable in a path between the part of the intermediate gear which meshes with the fly-knife shaft gear and said hub, and manual operating means for said clutch couple.

15. In a lawn mower, a ground wheel drive for a fly knife shaft including a gear train and an overrunning clutch associated therewith, said gear train having a main drive gear movably mounted on the hub of the ground wheel, and means for interrupting or completing said drive by relative axial shift of cooperating members of one of said two agencies first above named out of or into co-operative relation, one of said members being said main drive gear.

16. In a lawn mower, a ground wheel drive for a fly knife shaft including a gear train and an overrunning clutch associated therewith, said gear train having a main drive gear movably mounted on the hub of the ground wheel, and a spring normally completing said drive by holding said main drive gear and another cooperating member of one of said two agencies, first above named, in cooperative relation subject to interruption of the drive by their relative axial separation.

17. In a lawn mower, a cutter drive comprising a ground wheel, a fly-knife driving gear train including a main gear co-axial with the ground wheel, movable with respect thereto and driven thereby, and overruning clutch elements, and a casing housing said gear train and clutch elements, said drive being adapted to be completed or interrupted by relative axial shift of said main gear and another member of the driving connections, one of which elements is loose and the other fast with respect to the ground wheel.

18. In a lawn mower, a gear case, a ground wheel having a hub extending into the gear case, and a cutter driving gear train in said case including a main drive gear movably mounted on the hub of the ground wheel and driven by the ground wheel, said gear train including operative connections adapted to be made or broken by a relative axial shift of said main gear and another member into or out of cooperative relation.

In testimony whereof, I have signed this specification.

CHARLES C. WORTHINGTON.

CERTIFICATE OF CORRECTION.

Patent No. 1,664,721.                                              Granted April 3, 1928, to

CHARLES C. WORTHINGTON.

It is hereby certified that error appears in the printed specification of the above numbered patent requiring correction as follows: Page 3, line 85, claim 11, strike out the word "hub" and insert the words "ground wheel", and line 88, strike out the word "thereby" and insert "by said hub"; and that the said Letters Patent should be read with these corrections therein that the same may conform to the record of the case in the Patent Office.

Signed and sealed this 1st day of May, A. D. 1928.

(Seal)

M. J. Moore,
Acting Commissioner of Patents.